(12) United States Patent
Christensen

(10) Patent No.: US 6,179,313 B1
(45) Date of Patent: Jan. 30, 2001

(54) MOTORCYCLE EXHAUST PIPE HEAT SHIELD AND METHOD OF MAKING SAME

(76) Inventor: Daniel C. Christensen, 2835 Wisconsin St., Sturtevant, WI (US) 53177

( * ) Notice: Under 35 U.S.C. 154(b), the term of this patent shall be extended for 0 days.

(21) Appl. No.: 09/378,913

(22) Filed: Aug. 23, 1999

(51) Int. Cl.[7] ............................. B62D 61/00; B62K 15/00
(52) U.S. Cl. ........................................ 280/219; 280/304.4
(58) Field of Search ................................ 280/291, 304.3, 280/304.4, 304.5

(56) References Cited

U.S. PATENT DOCUMENTS

| | | | |
|---|---|---|---|
| D. 395,024 | 6/1998 | Baratt | D12/114 |
| 3,756,623 | 9/1973 | Whittler | 280/289 |
| 4,023,821 | 5/1977 | Eiland | 280/291 |
| 4,174,852 | 11/1979 | Panzica | 280/291 |
| 4,802,684 | * 2/1989 | Bennett et al. | 280/291 |

* cited by examiner

Primary Examiner—Kevin Hurley
(74) Attorney, Agent, or Firm—Arthur J. Hansmann

(57) ABSTRACT

A motorcycle exhaust pipe heat shield arranged for protecting the footwear, clothing, and the foot of the motorcycle passenger. The shield is attachable to the motorcycle in a location intermediate the engine exhaust pipe and the floorboard for the passenger's foot. The shield presents an upright planar portion for shielding from the heat of the exhaust pipe, and it also presents an attachment bracket for readily and securely attaching the entire shield to the motorcycle. The method of making the shield includes the cutting of the blank from a sheet of metal and then appropriately forming and bending the blank to present the final configuration of the shield which is also surface finished with a reflective surface for esthetics as well as heat reflection.

9 Claims, 3 Drawing Sheets

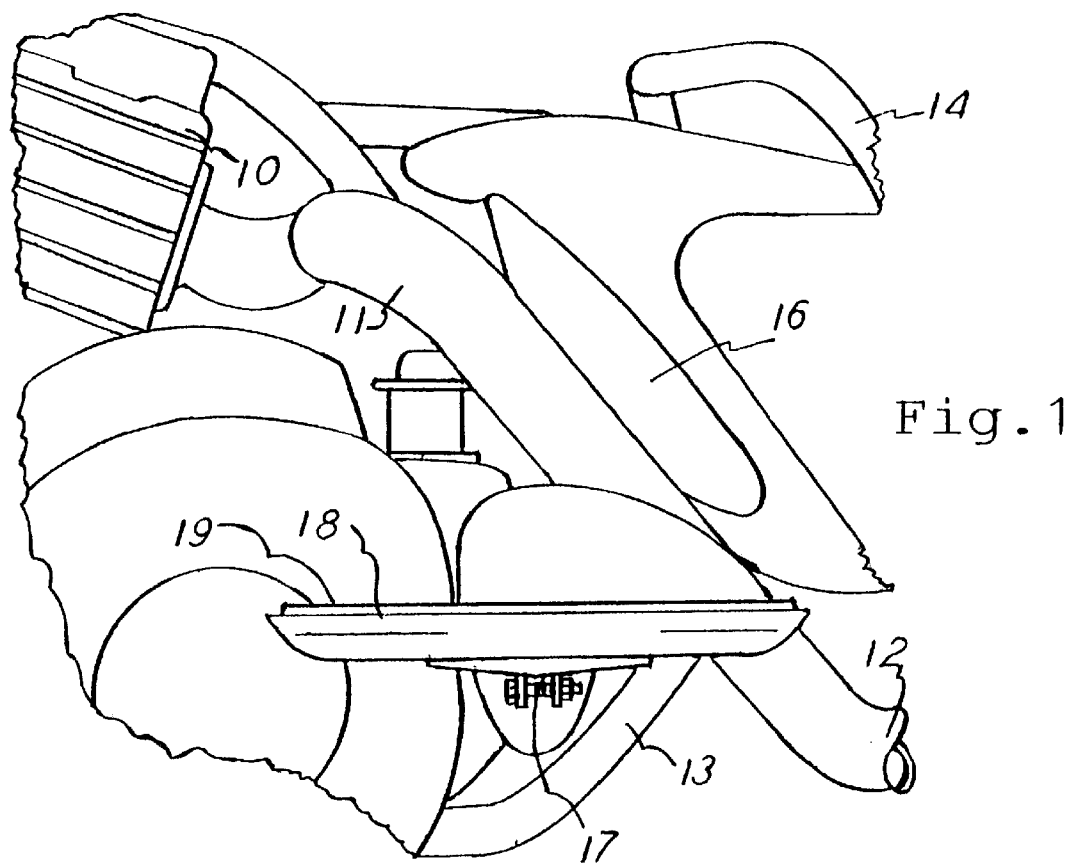
Fig. 1
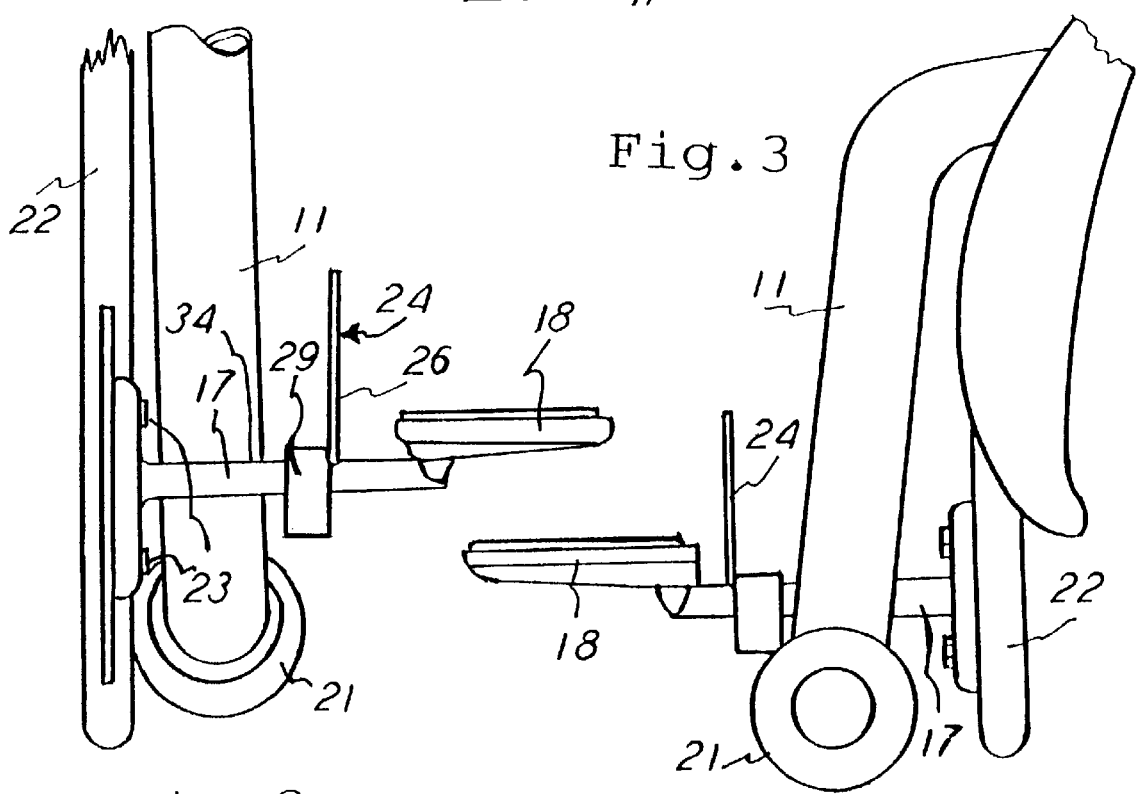
Fig. 2
Fig. 3

US 6,179,313 B1

MOTORCYCLE EXHAUST PIPE HEAT SHIELD AND METHOD OF MAKING SAME

This invention relates to a motorcycle exhaust pipe heat shield and to the method for making same.

BACKGROUND OF THE INVENTION

Gasoline engine powered motorcycles have there engines disposed substantially forward on the motorcycle, and then the engine exhaust pipe or pipes, if dual exhaust, extend along a side or sides of the motorcycle to the rear thereof. In that arrangement, the pipe, on either the left or right side of the motorcycle, or, as indicated with the dual exhaust along both sides of the motorcycle, are commonly close to the legs of the riders. The pipe is commonly provided with a cover or a type of heat shield which extends longitudinally along with the pipe, but that type of shield, while useful, becomes extremely hot, even to a point of quickly burning anything that comes into contact with it, such as the rider's clothing, shoes, or even legs.

The aforementioned problem is of particular concern with regard to the passenger riding on the motorcycle in the usual rearwardly located seat which is directly behind the driver. Of course the passenger commonly straddles the motorcycle from the seated position in the rear seat, and the passenger's legs therefore extend to the opposite sides of the motorcycle and immediately adjacent the exhaust pipes which are extending fore-and-aft relative to the forward direction of the motorcycle. As such, the rider's shoe or boot, or the rider's clothing and even the rider's legs are dangerously exposed to the very hot engine exhaust pipe which is extending along a side of the motorcycle in a position inwardly from the location of the rider's legs, in common riding arrangement. Also, there is usually provided a footrest or floorboard for the passenger's feet, and that floorboard is also commonly located immediately adjacent the hot exhaust pipe and thus the passenger is actually invited to place the feet, clothing, shoes, and legs in immediate risk relative to the hot pipe. As such there is the obvious danger.

It is an object of this invention to provide a heat shield mounted on the motorcycle to protect the shoes, boots, clothing, legs, and the like from the heat of the exhaust pipe of the motorcycle. In accomplishing this object, the invention herein provides for an after-market type of shield which can be readily mounted on the motorcycle and which serves the protective function indicated above, and the shield is also compatible in appearance, durability, and airflow function relative to the motorcycle.

Additionally, the objectives of this invention are to provide the heat shield, as mentioned, and to do so without interference with any part of the motorcycle, and to have the shield securely and readily mountable on the motorcycle arm which is supporting the footrest or floorboard. Therefore, the heat shield is readily disposed to be located between the floorboard and the hot exhaust pipe and thereby preclude the rider from encroaching upon the hot pipe, and it thus protects against the burn exposure mentioned above.

Another object is to provide the heat shield on either or both of the left and right hand sides of the motorcycle and to do so in a shield and a method of manufacturing the shield whereby it is readily and easily accomplished for the left hand and the right shields though they are somewhat different from each other. In that accomplishment, the left hand and right hand shields are readily manufactured and are readily and securely attached to the selected left or right sides or both sides of the motorcycle.

BRIEF DESCRIPTION OF THE DRAWINGS

FIG. 1 is a left side elevational view of a fragment of a conventional motorcycle with a shield of this invention mounted thereon.

FIGS. 2 and 3 are respectively front and rear elevational views of a fragment of FIG. 1 and showing the shield.

DETAILED DESCRIPTION OF THE PREFERRED SHIELD AND METHOD OF MAKING SAME

Figure 4:
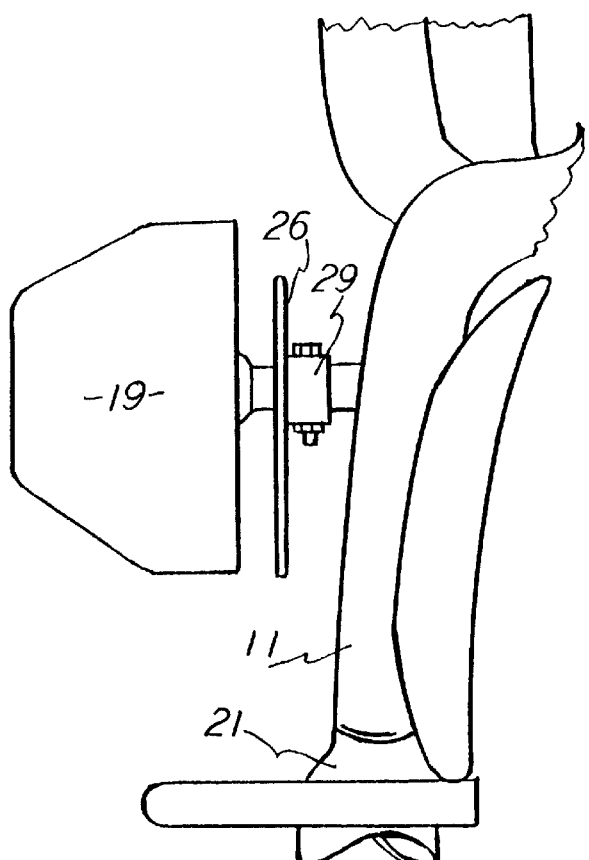
FIG. 4 is a top plan view of a fragment of FIG. 1 and showing the shield.

FIG. 1 shows a road worthy conventional motorcycle having an internal combustion 10 with an exhaust pipe 11 extending downwardly from the engine and rearwardly of the motorcycle in the rear extent 12. Thus, the front of the cycle is to the left, as viewed in FIG. 1, and it also includes the frame piece 13 and the rear crash bar 14 and the left side cover 16.

FIG. 1 also shows a laterally extending arm 17 which is rigidly connected with the remainder of the motorcycle and which supports a passenger floorboard 18 upon which the passenger normally places a foot, in this instance, the left foot. The floorboard 18 has an upper surface 19 which extends horizontally, as shown and which is available for supporting the foot of the passenger and is in the location described as being adjacent the exhaust pipe 11.

FIG. 4 also shows the usual exhaust muffler 21 connected to the pipe portion 12 and being disposed at the rear of the motorcycle.

FIGS. 2 and 3 also show another part 22 of the motorcycle frame, and the arm 17 is shown mounted on the frame piece 22 such as by means of the screws 23.

It will be understood that the passenger is seated on the cycle in the usual passenger's seat which is unshown, and the passenger would place the left foot on the floorboard 18 when in riding position and that places the foot and all immediately adjacent the hot exhaust pipe 11.

A heat shield 24 is mounted on the arm 17 and has a planar body portion 26 which extends uprightly in the fore-and-aft direction of the motorcycle movement and it extends between the exhaust pipe 11 and the floorboard 18. In this instance where the left side and thus the passenger's left foot is indicated, it will now be seen and understood that the passenger cannot move the foot to a vulnerable position relative to the hot exhaust pipe 11, and that is of course because the heat shield 24, being securely mounted on the arm 17 precludes the movement of the foot inwardly relatively to the fore-and-aft direction of the motorcycle.

Figure 6:
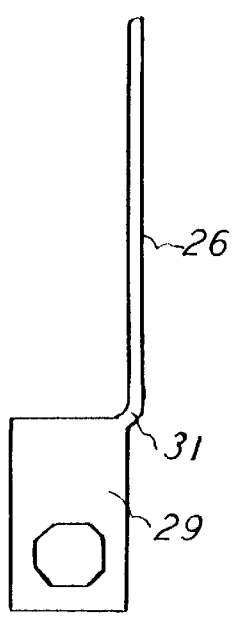
FIG. 6 is a left side elevational view of FIG. 5.
Figure 5:
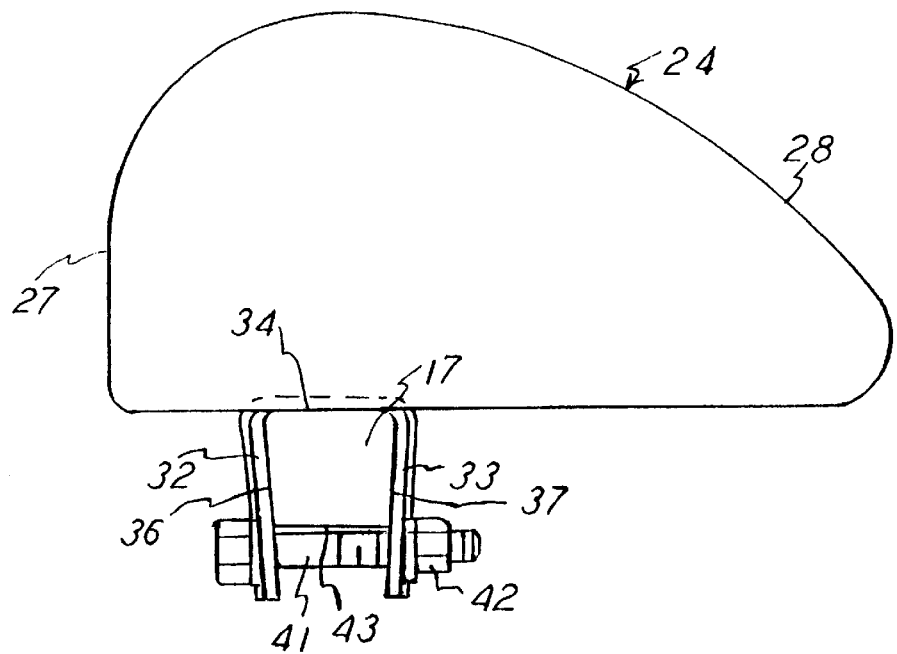
FIG. 5 is a left side elevational view of the shield of this invention and showing it mounted on a portion of the motorcycle and secured thereto.

The shield 24 also includes a U-shaped bracket portion 29 which is an integral part of the shield 24 but which is offset from the plane of the body 26, as viewed in FIGS. 2, 5, and 6, for instance. The bracket portion 29, being U-shaped, has a first segment 31 which is common to both the planar body 26 and to the U-shaped bracket 29 which then also includes the two upright and spaced-apart leg segments 32 and 33.

The bracket portion 29 can abut and rest upon the upper surface 34 of the laterally extending arm 17, and the bracket legs 32 and 33 are ultimately positioned in full contact with the fore-and-aft opposite sides 36 and 37 of the arm 17.

Figure 8:
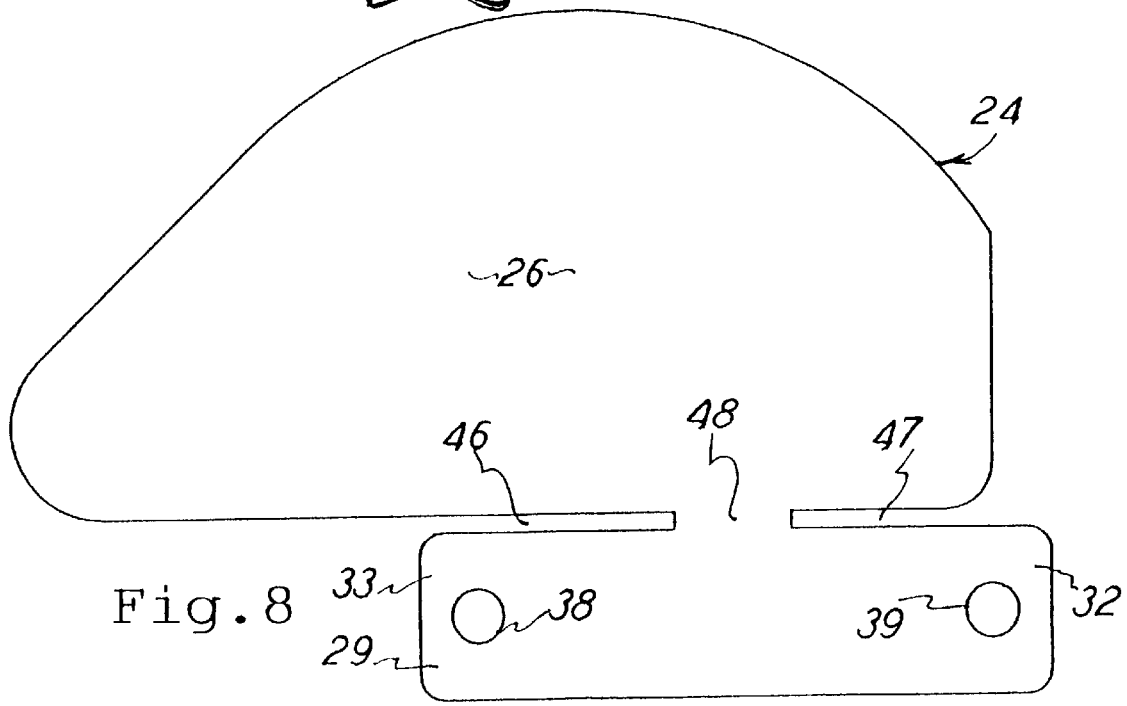
FIG. 8 is a plan view of the shield prior to its formation in final configuration for mounting on the motorcycle.

The legs 32 and 33 have bolt holes 38 and 39, as best seen in FIG. 8, and those holes receive the clamping bolt 41 which extends between the legs 32 and 33 and is secured thereon by means of the nut 42. Thus, with the U-shape mentioned, and with the substantially rectilinear cross-section of the arm 17, the shield 24 is secured to the arm 17 in a firm and reliably fixed position and by only a single bolt 41.

Also, the bracket 29 is offset from the plane of the shield body 26 and is thus concealed from an exterior view on the left side of the cycle, and thus it is esthetically appealing because only the planar body 26 is viewable from the left side of the cycle.

Figure 7:
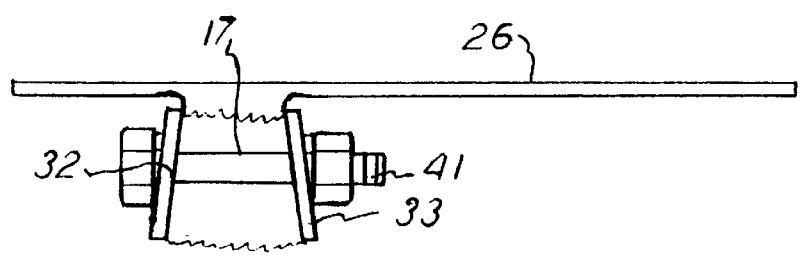
FIG. 7 is a bottom plan view of FIG. 5.

FIGS. 5 and 7 show that the arm 17 is trapezoidal shaped in cross sectional view and is of a smaller dimension at the bottom surface 43 compared to the top surface 34. Also, the arm 17 is shaped to be wider on the inboard side away from the floorboard 18 compared to the width at the floorboard 18, and that is as indicated in FIGS. 5 and 7.

It will therefore be understood that a left-hand or a right-hand heat shield 24 can be disposed on the respective side or both sides of the motorcycle in a position or positions between the exhaust pipe and passenger floorboard and in a position or positions where the floorboard upper surface 19 is on a plane which intersects the upright plane of the shield body 26, all to preclude inadvertent movement of the passenger's foot inwardly and closer to the hot pipe 11.

Figure 9:
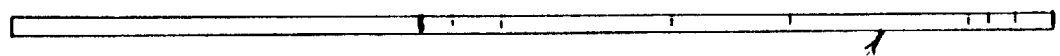
FIG. 9 is a bottom plan view of FIG. 8.

FIGS. 8 and 9 reveal the method of making the shield, and FIG. 8 is a view of the original sheet for making the shield and with the view being from the motorcycle inboard side of the left mountable shield. Thus, the shield 24 is initially cut into a blank from a flat planar sheet to have its configured body portion 26 and its initially flat bracket portion 29, both as seen in FIG. 8. That formation is made by means of a laser cutter applied to an original piece of a sheet-type metal of a size larger than the blank shown in its outline in FIG. 8. Two slots 46 and 47 are cut into the initial metal sheet, leaving a joining portion 48 integral with the body 26 and the bracket 29, as seen in FIG. 8. Also, the two bolt holes 38 and 39 are formed in the sheet, and all of the aforementioned is performed while the sheet is in its original sheet and planar orientation, as seen in FIGS. 8 and FIG. 9.

Next, the bracket 29 and body 26 are controlled to form a right angle therebetween and by bending the original sheet at its portion 48 and, as viewed in FIG. 8, that bracket portion 29 can be bent up to the 90 degree position relative to the body 26. Finally, the bracket legs 32 and 33 are bent down to their 90 degree positions relative to the remainder of the bracket 29 and also to the portion 48. Also, the entire shield 24 can have a surface finish, either by electroplating or polishing, so that the surface is highly reflective of heat and is also visually attractive to match much of the chrome usually on the motorcycle itself.

The shield 24 is made of the stainless steel material, and it is thus sufficiently flexible for the cutting and bending described above. Also, with the U-shaped bracket 29 and with the substantially rectilinear cross-section of the arm 17, the bracket 29 can be clamped to the arm 17 in the secured position along the tapered length of the arm 17. Also, the legs 23, extending below the arm 17 will be moved together by virtue of the tensile force in the bolt 41 to thereby cause the legs 32 and 33 to assume the shape of the cross-section of the arm 17, and this is also by virtue of the degree of flexibility of the stainless steel material utilized. In that manner, the shield 24 is positioned in the correct position along the arm 17 so that it is properly spaced from both the pipe 11 and from the floorboard 18, and it is also secured in that position, all by means of the tapers on the arm 17.

While the aforementioned generally discloses the shield relative to the motorcycle passenger, the shield can also be used to protect the driver of the motorcycle. Thus, it is for any rider. Where the motorcycle has its exhaust pipe extending adjacent the driver's customary leg position, the shield 24 is disposed between the pipe and the driver's floor board or foot rest which is conventional but not shown herein. In all instances, the upper surface of the respective foot rest for either the passenger or the driver is on a horizontal plane, such as seen in FIG. 1., such that the plane of that surface intersects the shield portion 26. Thereby the shield acts as both a shield and a guard relative to the rider's foot, and it prevents heat from reaching the foot and it prevents the foot from being moved to a position dangerously close to the pipe.

The driver's foot rest would be mounted on a support on the motorcycle frame, such as with the support 17, and the shield can then be mounted on that driver's foot rest support, in a manner at least similar to that shown for the so-called passenger floor board 18.

In all instances, the shield 24, in its planar and upright portion 26, is disposed and of an overall projected area greater than one-half the length of an upper surface, such as surface 18, as viewed from the side as in FIG. 1, for instance. In that manner, the shield is sufficiently large to guard against the rider moving a foot off the foot rest and past the shield. Also, the shield is located to intersect the horizontal projection of the foot rest over all of the rear length of the foot rest. Therefore, the rider is not inclined to move the foot onto the pipe because that would require a reaching around the shield to touch the hot pipe.

What is claimed is:

1. An arrangement of a heat shield for a rider on a motorcycle, comprising:

a motorcycle which is movable in fore-and-aft directions, a support arm extending on said motorcycle laterally of the fore-and-aft directions, a rider floor board supported on said arm and extending horizontally for supporting a foot of the rider, an engine exhaust pipe on said motorcycle and extending adjacent said floor board, said heat shield having a planar portion disposed in an upright plane parallel to the fore-and-aft directions and extending at an elevation above that of the horizontal extend of said floor board and extending between said pipe and said floor board, said heat shield having a bracket portion integral with said planar portion and extending therebelow and including two legs spaced apart and disposed on said arm at opposite sides thereof, and a releasable fastener connected to said legs for attaching said shield to said arm.

2. The arrangement as claimed in claim 1, wherein said legs extend beyond said arm in extending ends and said fastener extends between said extending ends.

3. The arrangement as claimed in claim 1, wherein:

said arm opposite sides are two flat sides lying along respective flat planes which are disposed in spaced-apart positions relative to the fore-and-aft directions of movement of said motorcycle, and said legs are disposed on respective said flat sides and are in respective contact with said flat sides and are of a shape to lie along said planes to thereby lie flat on said flat sides.

4. The arrangement as claimed in claim 3, wherein said flat planes are non-parallel relative to each other.

5. The arrangement as claimed in claim 1, wherein said arm is approximately rectilinear in cross-sectional shape extending along a plane parallel to said fore-and-aft directions and has said opposite sides and a top extending between said opposite sides, and said bracket portion with said legs is U-shaped in a view of said bracket transverse to the parallel plane and said bracket is in snug contact with said opposite sides and said top.

6. The arrangement as claimed in claim 1, wherein:

relative to said fore-and-aft directions said planar portion has a forward edge and a rearward edge and an imaginary upright center line between said edges, and said bracket portion is disposed offset relative to said center line and thereby said planar portion is disposed along said upright plane relative to the location of said floor board.

7. The arrangement as claimed in claim 1, wherein said planar portion is of non-symetrical shape and has an overall projected area in a view thereof transverse to said upright plane, and presents the appearance of streamlining of said planar portion, said floor board having an upper surface disposed on a horizontal plane which intersects said upright plane, and said projected area being of a size greater than one-half of the size of said upper surface.

8. A method of making a heat shield for a rider on a motorcycle, comprising the steps of:

positioning an engine exhaust pipe on said motorcycle, positioning an arm on said motorcycle, positioning a rider floor board on said arm and adjacent said pipe, forming a planar shield to have it include a body portion and a bracket portion with both thereof disposed in one common plane and with said bracket portion being smaller than said body portion on said plane, forming two elongated slots along a straight line on said shield and with said slots being separated from each other and being located between said body portion and said bracket portion to form two separate ends of said bracket portion spaced from said body portion, forming a through-hole in each of said ends of said bracket, forming said shield to position said bracket portion at right angles to said body portion, positioning said ends of said bracket portion to positions at right angles to the remainder of said bracket portion to thereby form a U-shape with said bracket portion in a viewing angle transverse to said common plane, and mounting said shield onto said arm by having said U-shape straddle said arm and with said body portion being disposed between said floor board and said pipe, and applying a fastener extending through said holes for attaching said shield to said arm.

9. The method of making a heat shied as claimed in claim 8, including the step of applying a smooth finish to said shield for enhancing reflection of heat by said shield.

* * * * *